(12) United States Patent
Schwan et al.

(10) Patent No.: US 8,792,331 B2
(45) Date of Patent: Jul. 29, 2014

(54) METHOD OF PROVIDING A SUCCESSOR LIST

(75) Inventors: Nico Schwan, Stuttgart (DE); Thomas Strauss, Esslingen (DE); Marco Tomsu, Ditzingen (DE)

(73) Assignee: Alcatel Lucent, Paris (FR)

( * ) Notice: Subject to any disclaimer, the term of this patent is extended or adjusted under 35 U.S.C. 154(b) by 27 days.

(21) Appl. No.: 12/492,872

(22) Filed: Jun. 26, 2009

(65) Prior Publication Data
US 2009/0323696 A1 Dec. 31, 2009

(30) Foreign Application Priority Data

Jun. 27, 2008 (EP) .................................. 08290625

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04L 12/24* | (2006.01) | |
| *H04L 12/437* | (2006.01) | |
| *H04L 29/08* | (2006.01) | |
| *H04L 12/56* | (2006.01) | |

(52) U.S. Cl.
CPC .......... *H04L 41/0836* (2013.01); *H04L 12/437* (2013.01); *H04L 67/1048* (2013.01); *H04L 45/28* (2013.01)
USPC ........... 370/217; 370/216; 370/221; 370/222; 714/1

(58) Field of Classification Search
None
See application file for complete search history.

(56) References Cited

U.S. PATENT DOCUMENTS 6,353,412 B1 * 3/2002 Soliman ........................ 342/387
7,916,630 B2 * 3/2011 Berndt et al. ................. 370/222

(Continued)

FOREIGN PATENT DOCUMENTS

EP 1 876 788 A1 1/2008

OTHER PUBLICATIONS

Ion Stoica et al., "Chord: Scalable Peer-to-Peer Lookup Protocol for Internet Applications," IEEE, ACM Transactions on Networking, vol. 11, No. 1, XP011077215, pp. 17-32, (Feb. 1, 2003).

(Continued)

*Primary Examiner* — Ayaz Sheikh
*Assistant Examiner* — Peter Chau
(74) *Attorney, Agent, or Firm* — Fay Sharpe LLP

(57) ABSTRACT

The invention concerns a method of providing a successor list (L) for routing in a peer-to-peer overlay network (N), and a network node and a computer program product to execute this method. The peer-to-peer overlay network (N) comprises a plurality of nodes (0, 20, 50, 87, 112, 140, 179, 200, 211, 223, 240). The successor list (L) specifies identifiers of at least two successor nodes (211, 223) subsequently succeeding a first node (200) of the plurality of nodes (0, 20, 50, 87, 112, 140, 179, 200, 211, 223, 240) with regard to a topology structure of the peer-to-peer overlay network. It is determined whether the at least two successor nodes (211, 223) listed in the successor list (L) run on the same physical hardware. If the at least two successor nodes (211, 223) run on the same physical hardware, an identifier of at least one additional node (240) of the plurality of nodes (0, 20, 50, 87, 112, 140, 179, 200, 211, 223, 240) which succeeds the at least two successor nodes (211, 223) with regard to the topology structure of the peer-to-peer overlay network (N) and runs on a different physical hardware than the at least two successor nodes (211, 223) is added to the successor list (L).

9 Claims, 5 Drawing Sheets

(56) References Cited

U.S. PATENT DOCUMENTS

| | | | |
|---|---|---|---|
| 2005/0223102 A1* | 10/2005 | Zhang et al. | 709/228 |
| 2007/0230468 A1* | 10/2007 | Narayanan et al. | 370/392 |
| 2007/0230482 A1* | 10/2007 | Shim et al. | 370/400 |
| 2008/0123664 A1* | 5/2008 | Schwan et al. | 370/395.32 |
| 2008/0148015 A1* | 6/2008 | Takamoto et al. | 712/203 |
| 2008/0288654 A1* | 11/2008 | Matuszewski et al. | 709/238 |
| 2009/0213754 A1* | 8/2009 | Melamed | 370/254 |
| 2011/0060843 A1* | 3/2011 | Shim et al. | 709/238 |
| 2011/0110269 A1* | 5/2011 | Maenpaa | 370/254 |

OTHER PUBLICATIONS

Gisik Kwon et al, "BYPASS: Topology-Aware Lookup Overlay for DHT-Based P2P File Locating Services," Proceedings of the Tenth International Conference on Parallel and Distributed Systems, XP010710896, 8 pages, ( Jul. 7, 2004).

Wanxia Xie et al., "Optimizing Peer Virtualization and Load Balancing," Database Systems for Advanced Applications Lecture Notes in Computer Science, vol. 3882, XP019030008, pp. 357-373, (Jan. 1, 2006).

Binzenhofer A. et al., "On the Stability of Chord-Based P2P Systems," Global Telecommunications Conference, IEEE Globecom 2005, vol. 2, XP010879593, pp. 884-888, (Nov. 28, 2005).

Kristian Waagan, "Building a Replicated Data Store Using Berkeley DB and the Chord DHT," Undergraduate Thesis, XP002504247, pp. 1-91, (Aug. 22, 2005).

European Search Report.

Waagan, Kristian, "Building a Replicated Data Store using Berkeley DB and the Chord DHT", Student thesis, 2005, URL: http://ntnu.diva-portal.org/smash/record.jsf?pid=diva2:348050&rvn=2.

Yoshinaga, Hirokazu, et.al., "Distributed Cooperative Storage Architecture in Peer-to-Peer Networks", The Institute of Electronics, Information and Communication Engineers, IEICE Technical Report, Jun. 16, 2005, vol. 105, No. 127, p. 81-84.

* cited by examiner

METHOD OF PROVIDING A SUCCESSOR LIST

BACKGROUND OF THE INVENTION

The invention is based on a priority application EP08290625.6 which is hereby incorporated by reference.

The present invention relates to a method of providing a successor list for routing in a peer-to-peer overlay network, and a network node and a computer program product to execute said method.

Peer-to-peer (=P2P) overlay networks are used for a broad number of applications such as VoIP (e.g., Skype) or file-sharing (e.g., eMule) (VoIP=Voice over Internet Protocol). Features like high scalability, self-organisation and fault tolerance are achieved by a distributed architecture and data storage on collectively provided and used resources. The P2P network consists of nodes acting as peers, i.e., both as clients and as servers of the network. In the following description, the terms "node" and "peer" are used interchangeably. Each node of the network maintains one or more logical links to other nodes that are established with respect to an overlay algorithm and used for message transmission.

State-of-the-art P2P networks build a logical topology structure based on overlay specific algorithms that are agnostic of the underlying network infrastructure. Each node maintains one or more links to other nodes that are used for message routing in a broadcast manner (unstructured overlays, e.g. Gnutella) or in an ID-based manner (structured overlays using a Distributed Hash Table (=DHT), e.g. Chord) (ID=identification/identifier). Some systems use hybrid architectures with unstructured groups of peers, and these groups are the structured in a larger topology (e.g. Skype).

P2P networks are totally decentralised. Peers participating in the overlay may leave the network ungracefully and at random time. To maintain the topology structure of a P2P network in case of node failures, it is mandatory that each node maintains several links to direct neighbour nodes. In Chord, e.g., each peer maintains a so-called "redundant successor list" which stabilises the P2P ring topology if one or more of the succeeding neighbour peers ungracefully leaves the P2P overlay.

FIG. 1a shows a prior art structured P2P overlay network N comprising a plurality of nodes 0, 20, 50, 87, 112, 140, 179, 200, 211, 223, 240. In particular, FIG. 1a illustrates a Chord ring N. The reference signs 0, 20, 50, 87, 112, 140, 179, 200, 211, 223, 240 of the nodes are meant to represent also the node IDs of the nodes 0, 20, 50, 87, 112, 140, 179, 200, 211, 223, 240. In Chord the nodes maintain direct connections to their predecessor and successor nodes, which results in a ring topology.

In the P2P Chord ring N, the ring topology structure is kept stable by using a successor list, which may also be called redundant successor list (=RSL). As shown in FIG. 1a, a first node 200 of the plurality of nodes 0, 20, 50, 87, 112, 140, 179, 200, 211, 223, 240 maintains a successor list specifying identifiers of two successor nodes 211, 223 subsequently succeeding the first node 200. If the first successor node 211 crashes and leaves the ring, as is shown in FIG. 1b, the first node 200 still has a link to the other successor node 223 listed in the successor list. By means of the redundancy of successor nodes in the successor list, the topology structure of the peer-to-peer overlay network can be maintained. If multiple subsequent successor nodes neighbouring the first node 200 crash and the successor list does not list enough successor nodes such that the ring can be closed, the topology structure cannot be maintained and the ring breaks. Consequently the stability of the ring topology depends on the number of successor nodes listed in the successor list: the more successor nodes the more stable the ring.

SUMMARY OF THE INVENTION

It is the object of the present invention to provide an improved method of providing a successor list for routing in a peer-to-peer overlay network. Moreover, it is the object of the present invention to provide a corresponding network node and a corresponding computer program product to execute this improved method.

The object of the present invention is achieved by a method of providing a successor list for routing in a peer-to-peer overlay network comprising a plurality of nodes, whereby the successor list specifies identifiers of at least two successor nodes subsequently succeeding a first node of the plurality of nodes with regard to a topology structure of the peer-to-peer overlay network, the method comprising the steps of determining whether the at least two successor nodes listed in the successor list run on the same physical hardware, and if the at least two successor nodes run on the same physical hardware, adding to the successor list an identifier of at least one additional node of the plurality of nodes which succeeds the at least two successor nodes with regard to the topology structure of the peer-to-peer overlay network and runs on a different physical hardware than the at least two successor nodes. Moreover, the object of the present invention is achieved by a first node of a peer-to-peer overlay network comprising a plurality of nodes, the first node maintaining a successor list for routing in the peer-to-peer overlay network, whereby the successor list specifies identifiers of at least two successor nodes subsequently succeeding the first node with regard to a topology structure of the peer-to-peer overlay network, whereby the first node comprises a control unit adapted to determine whether the at least two successor nodes listed in the successor list run on the same physical hardware, and if the at least two successor nodes run on the same physical hardware, add to the successor list an identifier of at least one additional node of the plurality of nodes which succeeds the at least two successor nodes with regard to the topology structure of the peer-to-peer overlay network and runs on a different physical hardware than the at least two successor nodes. And the object of the present invention is achieved by a computer program product for providing a successor list for routing in a peer-to-peer overlay network comprising a plurality of nodes, whereby the successor list specifies identifiers of at least two successor nodes subsequently succeeding a first node of the plurality of nodes with regard to a topology structure of the peer-to-peer overlay network, whereby the computer program product, when executed by the first node, performs the steps of determining whether the at least two successor nodes listed in the successor list run on the same physical hardware, and if the at least two successor nodes run on the same physical hardware, adding to the successor list an identifier of at least one additional node of the plurality of nodes which succeeds the at least two successor nodes with regard to the topology structure of the peer-to-peer overlay network and runs on a different physical hardware than the at least two successor nodes.

If a redundant successor list is based on the overlay specific node ID only, i.e. without considering the underlying physical hardware, as is the case in the prior art systems, it is possible that two successor nodes subsequently succeeding a node which routes according to the successor list are located on the same physical machine (e.g., a personal computer). If this physical hardware fails, the two successor nodes quit the DHT at the same time and the topology structure of the P2P overlay network is broken if the successor list maintained by the node only has links to peers running on the hardware that has failed. The present invention solves this problem encountered in the prior art.

The present invention introduces an algorithm for providing a successor list which is based on the overlay topology specifics but at the same time respects the underlying physical hardware of the P2P overlay network. The invention describes a network node (=logical peer) which includes information about the physical hardware whereon nodes of the network are running into a provision of the successor list and a routing based on the successor list.

Unlike prior art where nodes located on the same physical machine (e.g. through virtualisation of Operating Systems, e.g. XEN, VMware) are not aware of this, the present invention presents a system for providing a successor list which identifies the physical hardware on which one or more of the network nodes are running and considers this information about the physical hardware for a suitable redundant successor list. According to the invention, if a successor list only lists successor node running on the same hardware A, the successor list is amended so that the successor list also comprises one or more successor nodes running on a different hardware B.

The present invention provides a secure way of providing a successor list. As a successor list is a strategy to prevent the destruction of a topology structure in case of a node failure, the successor list according to the present invention respects the physical hardware of potential or actual successor nodes to make sure that successor nodes do not run on the same physical node. This is not considered by prior art DHT algorithms. Especially in small deployments (up to 100 nodes), nodes are hosted on the same physical node (e.g. in virtualisation environments, e.g. VMware, Xen, . . . ). In prior art where the physical hardware of a node is disregarded, it is therefore likely that a topology structure is broken in case of a failure of multiple peers. The present invention avoids this risk by means of a successor list provision that considers the physical hardware of a node.

Thus, the present invention is especially helpful in small deployments where the probability that neighbour nodes are hosted on the same physical machine is increased. The present invention avoids the breaking of a topology structure by means of a mapping of the physical location and the overlay node ID.

The invention maintains a redundancy of P2P topologies in virtual environments. And, the invention provides a higher efficiency because the successor list is automatically optimised to have the right length.

In contrast to current P2P overlays where the successor lists are based on overlay specifics, the present invention provides a solution that considers virtualisation solutions on top of a distributed physical hardware infrastructure for the overlay topology creation and provision of redundant successor lists in a P2P network.

Furthermore, this invention describes an improvement for a fundamental technology that can be beneficially used in distributed environments such as server clusters or pure P2P telephony systems. In particular, this kind of technology could be included in IETF P2P SIP (IETF=Internet Engineering Task Force; SIP=Session Initiation Protocol).

Further advantages are achieved by the embodiments of the invention indicated by the dependent claims.

According to a preferred embodiment of the invention, if the at least two successor nodes run on the same physical hardware, an identifier of as many additional nodes of the plurality of nodes which succeed the at least two successor nodes with regard to the topology structure of the peer-to-peer overlay network and which run on a different physical hardware than the at least two successor nodes are added to the successor list such that the total number of successor nodes listed in the successor list which run on different physical hardware becomes equal to a pre-defined redundancy factor.

According to a preferred embodiment, when a joining node joins the peer-to-peer overlay network in between the successor nodes listed in the successor list, the identifier of the joining node is added to the successor list. The physical hardware on which the joining node runs is determined. Preferably, said determination is performed by the first node. The identifier of the at least one additional node is removed from the successor list if the total number of successor nodes listed in the successor list which run on different physical hardware is equal to a pre-defined redundancy factor whereby the total number is except the at least one additional node, i.e., said total number is determined without counting the at least one additional node.

It is possible that the first node detects information about its own hardware and about hardware of other nodes of the network. The goal of this detection is to find out which nodes of the plurality of nodes are running on a same physical hardware. There are several possible ways to detect the physical hardware:

According to a preferred embodiment of the invention, said physical hardware on which the at least two successor nodes run is determined by retrieving information from a platform of the at least two successor nodes. Preferably, said retrieval is performed by the first node. In addition to or alternatively to the determination of said physical hardware on which the at least two successor nodes run, the physical hardware on which the at least one additional node runs is determined by retrieving information from a platform of the at least one additional node. Preferably, said retrieval is performed by the first node. In addition to or alternatively to the determination of said physical hardware on which the at least two successor nodes and the at least one additional node, respectively, run, the hardware on which the joining node runs is determined by retrieving information from a platform of the joining node. Preferably, said retrieval is performed by the first node. The platform may be a physical hardware on which the at least two successor nodes and/or the at least one additional node and/or the joining node run, e.g., a CPU (=Central Processing Unit), a computer, a network unit, etc. The information may be e.g. a CPU ID, a MAC address, a location, an IP address, a location, etc. associated with the platform of the at least two successor nodes and/or the at least one additional node and/or the joining node (MAC=Media Access Control). This includes any information that a software application is able to find out with the help of the operating system(s) of the network nodes. For instance, the MAC address usually is a relative secure way to determine a physical host, however this might not be the case if hardware virtualisation technology is used.

The invention modifies the replication method executed by the Chord peers and thus is able to improve the availability of data in case of physical node failures. The invention associates each peer node to a hardware identifier, e.g., a CPU ID, a MAC address, etc. which identifies the hardware platform hosting the peer node. The peer node uses the hardware identifiers to replicate the set of resources for which it is responsible on at least one peer node running on a different hardware platform, preferably the closest successor in terms of topology structure, e.g., in terms of peer IDs.

According to another preferred embodiment of the invention, said physical hardware on which the at least two successor nodes run is determined by retrieving information from an external management unit linked or associated with the at least two successor nodes. Preferably, said retrieval is performed by the first node. In addition to or alternatively to the determination of said physical hardware on which the at least two successor nodes run, the physical hardware on which the at least one additional node runs is determined by retrieving information from an external management unit linked or associated with the at least one additional node. Preferably, said retrieval is performed by the first node. In addition to or alternatively to the determination of said physical hardware on which the at least two successor nodes and the at least one additional node, respectively, run, the hardware on which the joining node runs is determined by retrieving information from an external management unit linked or associated with the joining node. Preferably, said retrieval is performed by the first node. The external management unit may also be an external cluster management entity whereby the term "cluster" refers to the P2P overlay network as a cluster of network nodes.

If an external cluster management entity is available, e.g. to configure the node IDs, the an external cluster management entity might also provide information about the physical topology of the cluster. The external cluster management entity may be a central enrollment server, a bootstrap server or a network management and monitoring server.

If a software application is not able to detect the needed hardware information, a manual (pre-)configuration of the nodes by a manager of the nodes is a solution. Preferably, said physical hardware on which the at least two successor nodes run is determined by retrieving corresponding information from a network operator of the peer-to-peer network and/or from a user of the at least two successor nodes. Preferably, said retrieval is performed by the first node. In addition to or alternatively to the determination of said physical hardware on which the at least two successor nodes run, the physical hardware on which the at least one additional node runs is determined by retrieving corresponding information from a network operator of the peer-to-peer network and/or a user of the at least one additional node. Preferably, said retrieval is performed by the first node. In addition to or alternatively to the determination of said physical hardware on which the at least two successor nodes and the at least one additional node, respectively, run, the hardware on which the joining node runs is determined by retrieving information from a network operator of the peer-to-peer network and/or a user of the joining node.

In a preferred embodiment, said physical hardware on which the at least two successor nodes run is determined by means of a measurement on an application layer associated with the at least two successor nodes. Preferably, said determination is performed by the first node. In addition to or alternatively to the determination of said physical hardware on which the at least two successor nodes run, the physical hardware on which the at least one additional node runs is determined by means of a measurement on an application layer associated with the at least one additional node. Preferably, said determination is performed by the first node. In addition to or alternatively to the determination of said physical hardware on which the at least two successor nodes and the at least one additional node, respectively, run, the hardware on which the joining node runs is determined by means of a measurement on an application layer associated with the joining node. Preferably, said determination is performed by the first node.

Said measurement on an application layer may be an application level probing mechanisms such as "ping" message exchanges. Based on said ping message exchange, nodes can estimate from the connection latency if other nodes are hosted on the same device. Also other already known methods can be used to estimate if nodes are on the same hardware: E.g. network co-ordinate systems try to gain knowledge about the underlying network by measuring some inter-node latency without the need of explicit measurements of all links. This allows putting nodes close together in the logical overlay when they are nearby in a physical topology. Another example is Pastry which adjusts its routing table continuously for locality by measuring the latency to other nodes.

Preferably, the control unit is adapted to route a peer-to-peer message from the first node to a node of the successor list based on a routing policy. If said node of the successor list is not reachable in the peer-to-peer overlay network, e.g., due to a failure of the physical hardware on which said node of the successor list is/was running, the control unit is adapted to route the peer-to-peer message from the first node to the at least one additional node based on the routing policy.

Preferably, a peer-to-peer message is routed from the first node to one or more nodes of the at least two successor nodes based on a routing policy. If said one or more nodes of the at least two successor nodes is not reachable in the peer-to-peer overlay network, e.g., due to a failure of the physical hardware on which the at least two successor nodes are/were running, the peer-to-peer message is routed from the first node to the at least one additional node based on the routing policy.

The routing policy specifies in which order to use the entries in the successor list. It is possible that the successor list comprises a sequence of identifiers of nodes. Then a routing policy may rule that the first node first tries to route the P2P message to a successor node of the successor list the identifier of which is the first identifier in the successor list. If this does not succeed, i.e., if the P2P message does not reach its destination, the first node then tries to route the P2P message to the at least one additional node the identifier of which is the second identifier in the successor list, and so on.

According to the invention, since it is unlikely that two different physical hardware units will fail at the same time, the at least one additional node will be reachable when the at least two successor nodes are not reachable since the at least one additional node and the at least two successor nodes run on different physical hardware. However, if a higher redundancy is required, an identifier of as many additional nodes of the plurality of nodes which succeed the at least two successor nodes with regard to the topology structure of the peer-to-peer overlay network and which run on a different physical hardware than the at least two successor nodes are added to the successor list such that the total number of successor nodes listed in the successor list which run on different physical hardware becomes equal to a pre-defined redundancy factor.

Preferably, the invention introduces a dynamic redundant successor list algorithm to maintain the P2P overlay in case two or more subsequent successor nodes that are running on the same physical hardware quit the overlay. The dynamic redundant successor list algorithm provides that identifiers of successor nodes are added to the redundant successor list if one or more successors in the RSL are running on the same hardware, e.g., by virtualisation software. To keep the Chord redundancy factor in a virtualisation environment the same as in a pure P2P environment—where each peer runs on its own hardware—a peer must maintain as much redundant successors to different hardware as in a pure P2P environment. Thereby it is unimportant how much peers are running on the same virtualisation platform. Besides, the dynamic redundant successor list algorithm provides that identifiers of redundant successor nodes are removed from the RSL if new peers, which are running on a different hardware than the nodes listed in the RSL, have joined the P2P network and have been added to the redundant successor list.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE INVENTION

Figure 1A:
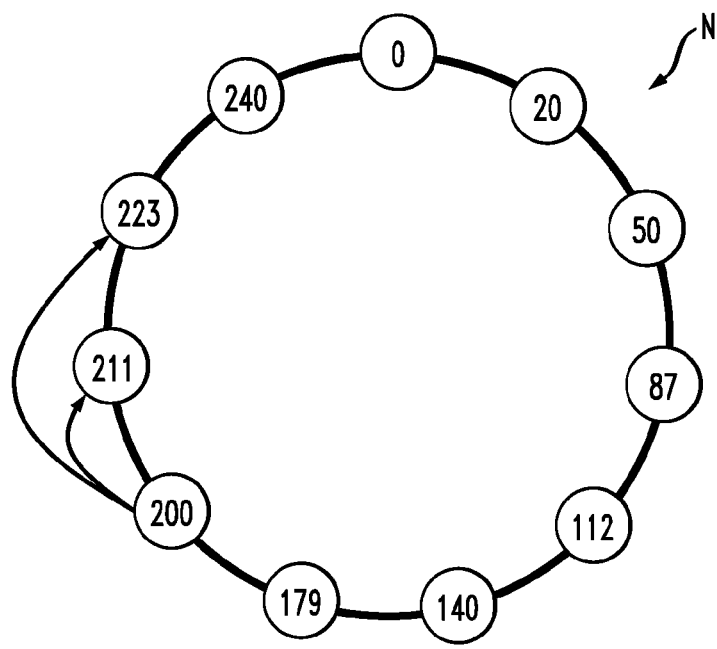
FIG. 1a shows a prior art structured P2P overlay network comprising a plurality of nodes.
Figure 1B:
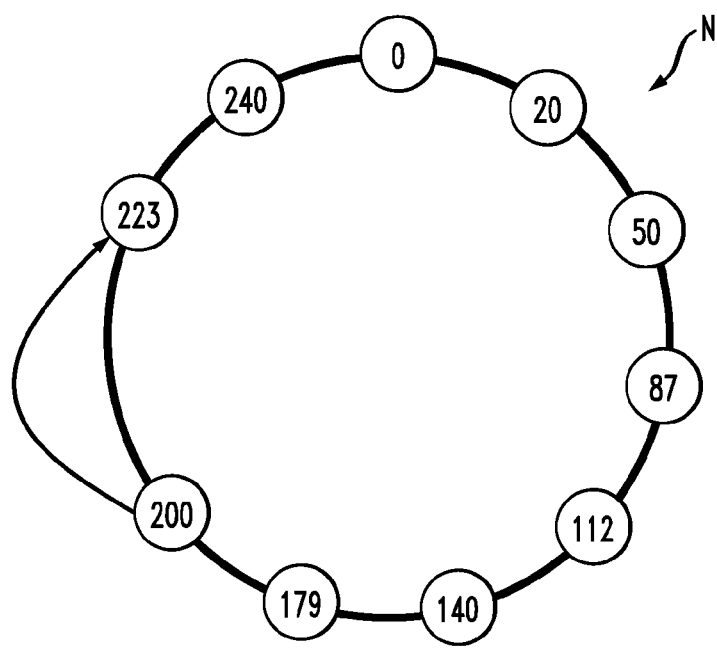
FIG. 1b shows the P2P overlay network of FIG. 1a where the first successor node crashes and leaves the ring.
Figure 2:
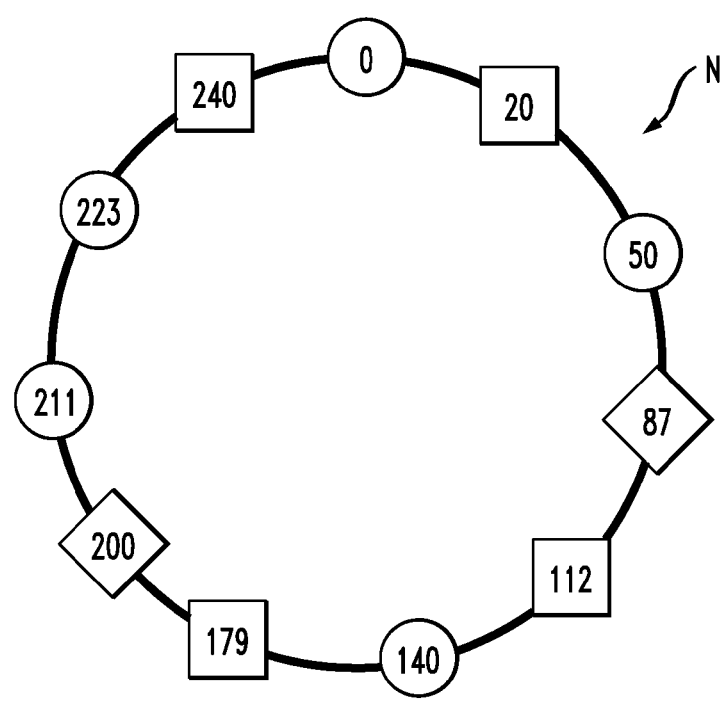
FIG. 2 shows a P2P overlay network according to an embodiment of the invention.

FIG. 2 shows a P2P overlay network according to an embodiment of the invention. In particular, FIG. 2 illustrates a Chord ring N according to an embodiment of the invention. The Chord ring N comprises a plurality of nodes 0, 20, 50, 87, 112, 140, 179, 200, 211, 223, 240 where the reference signs 0, 20, 50, 87, 112, 140, 179, 200, 211, 223, 240 are meant to represent also the node IDs of the nodes 0, 20, 50, 87, 112, 140, 179, 200, 211, 223, 240. The node IDs of the nodes are assigned by the overlay specific DHT algorithm and can for example be based on an enrollment server or chosen randomly by the node itself. Each node represents a peer of the Chord ring N.

In a first step of the method, a first node 200 determines the physical hardware on which the successor nodes contained in the successor list maintained by the first node 200 are running. Let us assume that the first node 200 maintains a successor list L with two entries: the one entry is an identifier, e.g., a node ID, of the node 211, and the other entry is an identifier, e.g., a node ID, of the node 223.

The first node 200 is composed of one or several interlinked computers, i.e., a hardware platform, a software platform basing on the hardware platform and several application programs executed by the system platform formed by the software and hardware platform. The functionality of the first node 200 is provided by the execution of these application programs. The application programs or a selected part of these application programs constitute a computer software product providing a routing service as described in the following, when executed on the system platform. Further, such computer software product is constituted by a storage medium storing these application programs or said selected part of application programs.

From a functional point of view, the first node 200 comprises a control unit for control of the functions of the first node, a storage medium for storing data, and an interface for exchange of information with other nodes.

For the determination of the physical hardware, the first node 200 may use any available information that helps to identify the physical hardware on which the successor nodes 211, 223 are running. It is possible that the first node 200 retrieves information about the physical hardware of the successor nodes 211, 223 by gathering information from a platform of the successor nodes 211, 223, e.g., a CPU ID, a MAC address, a location, an IP address, etc. Then, the first node 200 may gather corresponding information from the other nodes 0, 20, 50, 87, 112, 140, 179, 240 of the Chord ring N and compare the gathered pieces of information.

Besides the information available from a platform of the successor nodes 211, 223 (e.g. CPU ID, MAC address, location, IP, . . . ), the first node 211 may use information retrieved from an external management entity, provided by means of a manual configuration performed by a user of the hardware on which the successor nodes 211, 223 are running, gathered by means of application layer measurements, etc. Likewise, each of the other nodes 0, 20, 50, 87, 112, 140, 179, 211, 223, 240 may use any available information that helps to identify the physical hardware it is running on. It is possible that each of the other nodes 0, 20, 50, 87, 112, 140, 179, 211, 223, 240 communicates the gathered information about the respective physical hardware to the first node 200. It is also possible that the first node 200 accesses the physical hardware on which the other nodes 0, 20, 50, 87, 112, 140,179, 211, 223, 240 are running and collects the pieces of information about their respective physical hardware from the other nodes 0, 20, 50, 87, 112, 140, 179, 211, 223, 240.

The result of this step of classifying the physical hardware is illustrated in FIG. 2 which shows the hardware classification and illustrates this by different icon shapes for the nodes 0, 20, 50, 87, 112, 140, 179, 200, 211, 223, 240. Each shape represents another physical machine. That means that the nodes 0, 50, 140, 211, and 223 run on a first machine. The nodes 20, 112, 179, and 240 run on a second machine. The nodes 87 and 200 run on a third machine.

Figure 3A:
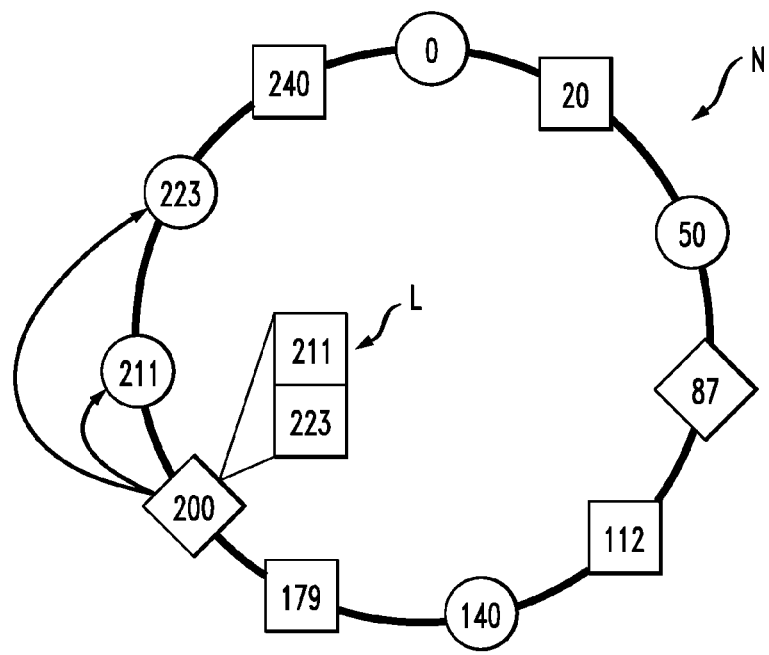
FIGS. 3a and 3b illustrate a failure of a physical hardware in the P2P overlay network shown in FIG. 2.
Figure 3B:
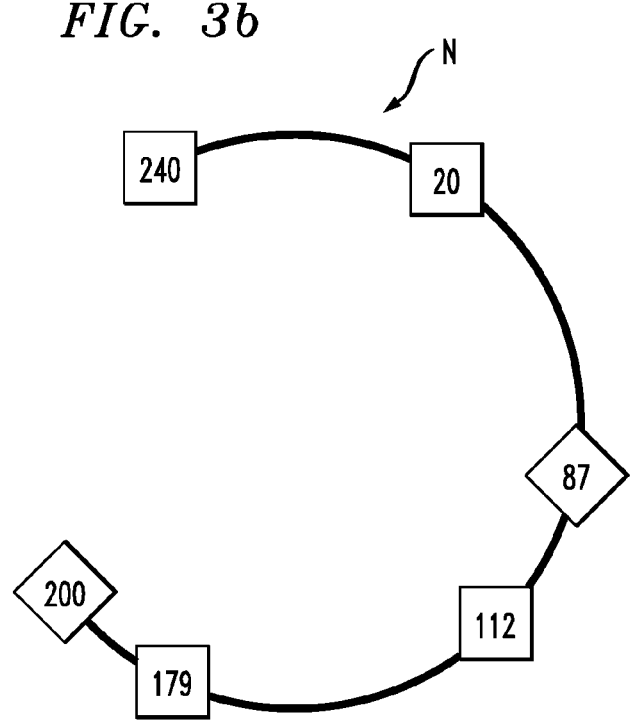

The problem which is encountered in the prior art and which is solved by the present invention is illustrated by means of the FIGS. 3a and 3b. Both node 211 and node 223 run on the same physical hardware, as indicated by the circle in FIG. 3a (for example through virtualisation of Operating Systems, e.g. XEN, VMware). FIG. 3b shows a failure of the physical hardware on which the two successor nodes contained in the successor list L run. The nodes 211 and 223 are running on the same machine. In FIG. 3b this machine crashes and the nodes 211 and 223 quit the ring N. Consequently the node 200 is out of links to active peers to maintain the ring topology. In this case, the first node 200 loses the connection to any successor node since both successor nodes 211, 223 kept in the RSL associated with the first node 200 are not reachable due to the hardware failure.

Figure 4A:
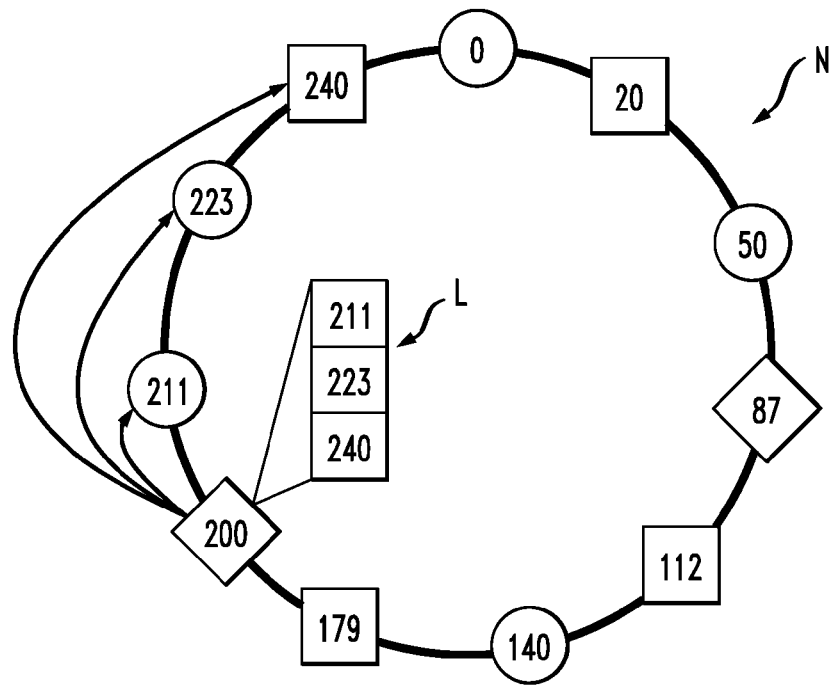
FIGS. 4a and 4b illustrate an adding algorithm in the P2P overlay network shown in FIG. 2 according to an embodiment of the invention.

FIG. 4a illustrates the method according to the invention for a dynamic redundant successor list adaptation. The nodes 0, 20, 50, 87, 112, 140, 179, 200, 211, 223, 240 identify the physical hardware they are running on. The first node 200 introduces a dynamic redundant successor list algorithm to keep the P2P overlay stable if subsequent neighbour peers 211, 223 that are hosted on the same physical hardware crash. Thereby, this algorithm comprises two sub-algorithms, an adding algorithm and a removing algorithm.

The adding algorithm adds peers to the RSL if multiple subsequent neighbour peers listed in the RSL are running on same physical machine.

As shown in FIG. 4a, the first node 200 adds an additional node 240 to the successor list L of the first node 200, thus expanding the successor list L. The reason for this addition is that the two successor nodes 211, 223, the identifiers of which were so far the only entries in the successor list L of the first node 200, are running on the same physical machine. Hence, if the machine on which the two successor nodes 211, 223 run crashes, the first node 200 still has left the node 240 in the successor list L of the first node 200, enabling the first node 200 left to close the ring topology of the network N.

To get the same redundancy factor as in a normal Chord environment where each peer runs on its own hardware, a peer has to add to the successor list the same amount of peers running on different hardware as the redundancy factor specifies.

Figure 4B:
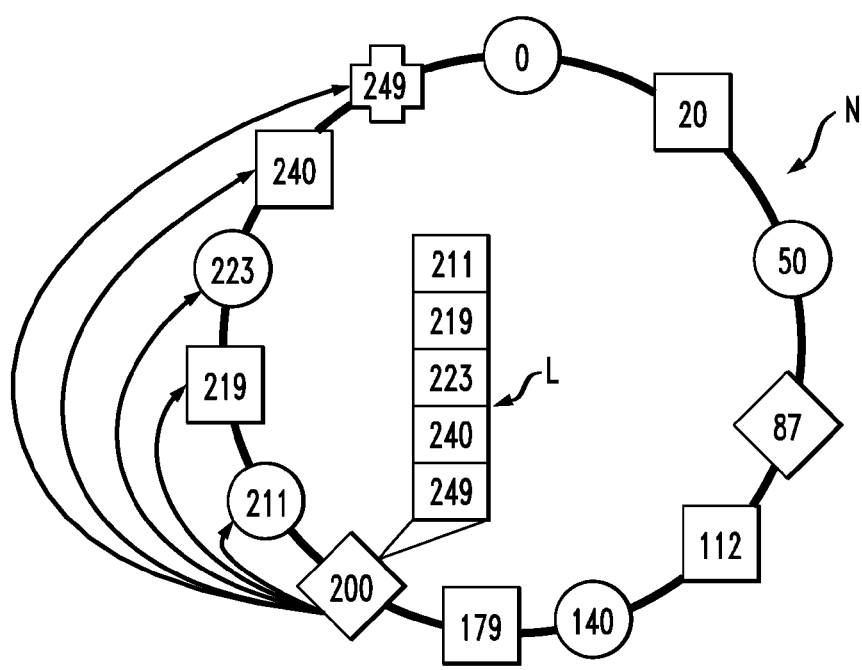

FIG. 4b shows a situation where the Chord ring N comprises a plurality of nodes 0, 20, 50, 87, 112, 140, 179, 200, 211, 219, 223, 240, and 249. Let us assume a case that a redundancy factor of three is realised according to the method of the present invention. A Chord redundancy factor of three needs requires the five nodes 211, 219, 223, 240, and 249 to be contained in the successor list L because the nodes 211 and 223 are running on the same physical machine and the nodes 219 and 240 are running on the same physical machine, too.

The removing algorithm removes peers from the RSL if the additional node that was added previously is no longer needed. This is the case if a node joins or leaves in the ID space that is covered by the RSL.

Figure 5A:
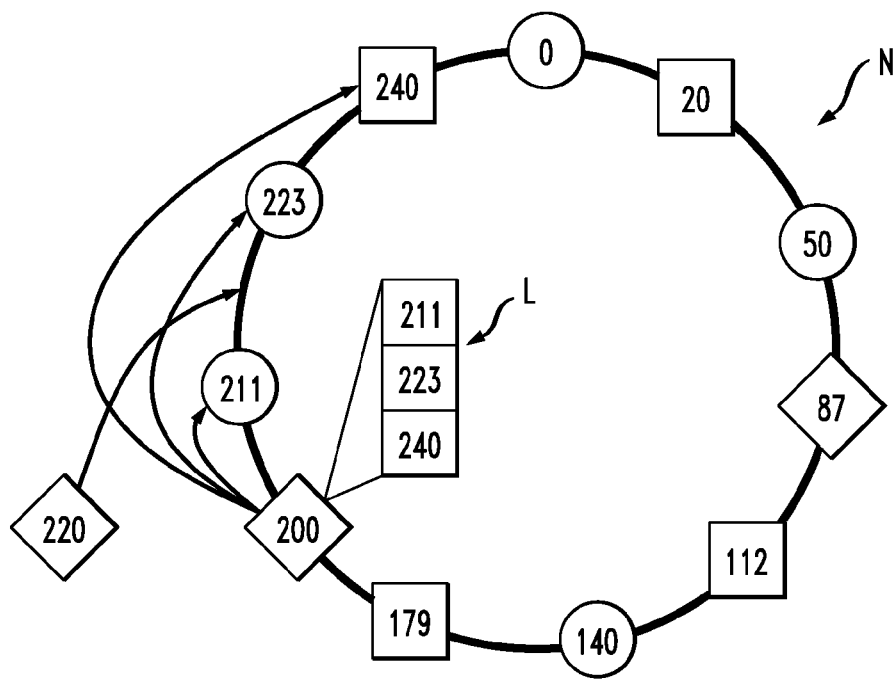
FIGS. 5a and 5b illustrate a removing algorithm in the P2P overlay network shown in FIG. 2 according to an embodiment of the invention.
Figure 5B:
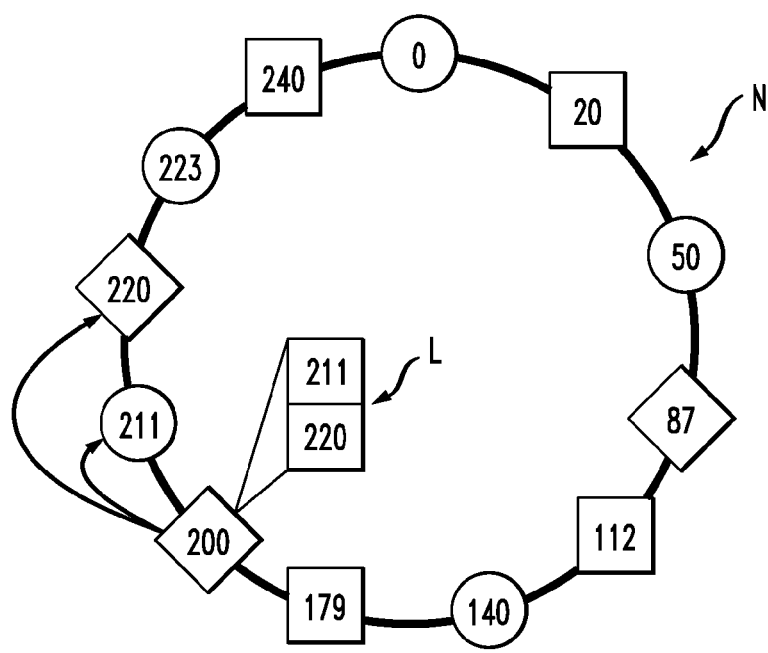

FIG. 5a shows a situation where the first node 200 maintains a successor list L containing the two original successor nodes 211 and 223 and the additional node 240 that was added later-on. The physical hardware on which the two original successor nodes 211 and 223 run is the same. The physical hardware on which the additional node 240 runs is different from the physical hardware on which the two original successor nodes 211 and 223 run.

A joining node 220 joins the peer-to-peer overlay network N in between the successor nodes 211 and 223 listed in the successor list L. An identifier, e.g., a node ID 220, of the joining node 220 is added to the successor list of the first node 200. Preferably, the first node 220 performs the amendment to its successor list L.

The first node 220 determines the physical hardware on which the joining node 220 runs. The first node 220 detects that the physical hardware on which the joining node 220 runs is different from the physical hardware on which the two original successor nodes 211 and 223 run and is different from the physical hardware on which the additional node 240 runs.

As a routing policy specifies that a redundancy factor of two is sufficient, the first node 200 removes the identifier of the additional node 240 from the successor list L. Then the total number of successor nodes 211, 220 listed in the successor list L which run on different physical hardware—without counting the at least one additional node 240 the identifier of which has been removed from the successor list L—is equal to the pre-defined redundancy factor of two.

The invention claimed is:

1. A computer-implemented method of providing a successor list for routing in a peer-to-peer overlay network having a distributed hash table (DHT) ring topology, the peer-to-peer overlay network comprising a plurality of nodes, the successor list specifying identifiers of at least two successor nodes subsequently succeeding a first node of the plurality of nodes with regard to the ring topology of the peer-to-peer overlay network, the method comprising:

determining, by the first node, whether the at least two successor nodes listed in the successor list run on the same physical hardware;

when the at least two successor nodes run on the same physical hardware, adding, by the first node, to the successor list an identifier of at least one additional node of the plurality of nodes which succeeds the at least two successor nodes with regard to the ring topology of the peer-to-peer overlay network and runs on a different physical hardware than the at least two successor nodes;

when a joining node joins the peer-to-peer overlay network in between the at least two successor nodes listed in the successor list, adding, by the first node, an identifier of the joining node to the successor list;

determining, by the first node, a physical hardware on which the joining node runs; and removing, by the first node, an identifier of at least one node from the successor list and maintaining a number of determined different physical hardware in the successor list equal to a pre-defined redundancy factor.

2. The method of claim 1, wherein the method further comprises:

when the at least two successor nodes run on the same physical hardware, adding to the successor list an identifier of as many additional nodes of the plurality of nodes which succeed the at least two successor nodes with regard to the ring topology of the peer-to-peer overlay network and which run on a different physical hardware than the at least two successor nodes such that a total number of successor nodes listed in the successor list which run on different physical hardware becomes equal to a pre-defined redundancy factor.

3. The method of claim 1, wherein the method further comprises:

determining the physical hardware on which the at least two successor nodes and the at least one additional node runs by retrieving information from a platform of the at least two successor nodes and the least one additional node.

4. The method of claim 1, wherein the method further comprises:

determining the physical hardware on which the at least two successor nodes and the at least one additional node runs by retrieving information from an external management unit linked with the at least two successor nodes and the at least one additional node.

5. The method of claim 1, wherein the method further comprises:

determining the physical hardware on which the at least two successor nodes and the at least one additional node runs by retrieving corresponding information from a network operator of the peer-to-peer overlay network and a user of the at least two successor nodes and the at least one additional node.

6. The method of claim 1, wherein the method further comprises:

determining the physical hardware of the at least two successor nodes and the at least one additional node runs using a latency measurement on an application layer of the peer-to-peer overlay network.

7. A first node of a peer-to-peer overlay network having a distributed hash table (DHT) ring topology, the peer-to-peer overlay network comprising a plurality of nodes, the first node configured to maintain a successor list for routing in the peer-to-peer overlay network, the successor list specifying identifiers of at least two successor nodes subsequently succeeding the first node with regard to the ring topology of the peer-to-peer overlay network, the first node comprising:

a control unit configured to:

determine whether the at least two successor nodes listed in the successor list run on the same physical hardware;

when the at least two successor nodes run on the same physical hardware, add to the successor list an identifier of at least one additional node of the plurality of nodes which succeeds the at least two successor nodes with regard to the ring topology of the peer-to-peer overlay network and runs on a different physical hardware than the at least two successor nodes;

when a joining node joins the peer-to-peer overlay network in between the at least two successor nodes listed in the successor list, add an identifier of the joining node to the successor list;

determine a physical hardware on which the joining node runs;

remove an identifier of at least one node from the successor list and maintain a number of determined different physical hardware in the successor list equal to a pre-defined redundancy factor.

8. The first node of claim 7, wherein the control unit is further configured to:

route a peer-to-peer message from the first node to a node of the successor list based on a routing policy, and if said node of the successor list is not reachable in the peer-to-peer overlay network, route the peer-to-peer message from the first node to the at least one additional node based on the routing policy.

9. A computer program product comprising a non-transitory computer readable medium with instructions stored therein and when the instructions are executed performs a method of:

providing a successor list for routing in a peer-to-peer overlay network having a distributed hash table (DHT) ring topology, the peer-to-peer overlay network comprising a plurality of nodes, the successor list specifying identifiers of at least two successor nodes subsequently succeeding a first node of the plurality of nodes with regard to the ring topology of the peer-to-peer overlay network;

determining, by the first node, whether the at least two successor nodes listed in the successor list run on the same physical hardware;

when the at least two successor nodes run on the same physical hardware, adding, by the first node, to the successor list an identifier of at least one additional node of the plurality of nodes which succeeds the at least two successor nodes with regard to the ring topology of the peer-to-peer overlay network and runs on a different physical hardware than the at least two successor nodes;

when a joining node joins the peer-to-peer overlay network in between the at least two successor nodes listed in the successor list, adding, by the first node, an identifier of the joining node to the successor list;

determining, by the first node, a physical hardware on which the joining node runs; and removing, by the first node, an identifier of at least one node from the successor list and maintaining a number of determined different physical hardware in the successor list equal to a pre-defined redundancy factor.

* * * * *